(12) United States Patent
Fleischer et al.

(10) Patent No.: US 9,103,742 B2
(45) Date of Patent: Aug. 11, 2015

(54) SENSOR LINE FOR MONITORING FOR AND LOCATING LEAKS AND METHOD FOR ITS PRODUCTION

(75) Inventors: Patrick Fleischer, Erlangen (DE); Walter Knoblach, Forchheim (DE); Jan Zach, Erlangen (DE)

(73) Assignee: Areva GmbH, Erlangen (DE)

( * ) Notice: Subject to any disclaimer, the term of this patent is extended or adjusted under 35 U.S.C. 154(b) by 1579 days.

(21) Appl. No.: 12/404,361

(22) Filed: Mar. 16, 2009

(65) Prior Publication Data

US 2009/0235723 A1 Sep. 24, 2009

(30) Foreign Application Priority Data

Mar. 18, 2008 (DE) .................... 10 2008 014 808

(51) Int. Cl.
*G01M 3/28* (2006.01)
*G01M 3/20* (2006.01)
*G01M 3/22* (2006.01)

(52) U.S. Cl.
CPC .. *G01M 3/20* (2013.01); *G01M 3/22* (2013.01)

(58) Field of Classification Search
CPC ............ G01M 3/20; G01M 3/22; G01M 3/28
USPC .......................................... 73/40.5 R, 40.5 A
See application file for complete search history.

(56) References Cited

U.S. PATENT DOCUMENTS

| 3,977,233 A | | 8/1976 | Issel | |
| 4,210,529 A | * | 7/1980 | Petersen | ........................ 210/646 |
| 4,735,095 A | | 4/1988 | Issel | |
| 4,748,288 A | * | 5/1988 | Bitter et al. | .................... 585/818 |
| 5,123,937 A | * | 6/1992 | Shibata et al. | ..................... 95/46 |
| 6,436,257 B1 | * | 8/2002 | Babas-Dornea et al. | ..... 204/415 |
| 6,854,602 B2 | * | 2/2005 | Oyama et al. | ................. 210/490 |
| 6,898,962 B2 | | 5/2005 | Jax | |
| 7,770,435 B2 | * | 8/2010 | Issel et al. | ......................... 73/40 |
| 2008/0053198 A1 | * | 3/2008 | Issel et al. | ................. 73/40.5 R |

FOREIGN PATENT DOCUMENTS

| DE | 2431907 A1 | | 1/1976 |
| EP | 0175219 B1 | | 5/1988 |
| JP | 62-22853 | * | 1/1987 |
| JP | 62-167390 | * | 7/1987 |
| RU | 2246659 C1 | | 2/2005 |

(Continued)

OTHER PUBLICATIONS

Zhang, H. et al., "The Permeability Characteristics of Silicone Rubber", Society for the Advancement of Material and Process Engineering, 2006 SAMPE Fall Techincal Conference, 'Global Advances in Materials and Process Engineering', Nov. 6-9, 2006, pp. 1-10.*

(Continued)

*Primary Examiner* — Daniel S Larkin

(74) *Attorney, Agent, or Firm* — Laurence A. Greenberg; Werner H. Stemer; Ralph E. Locher

(57) ABSTRACT

A sensor line for monitoring for and locating leaks in an installation, in which chlorine escapes to the area surrounding the installation if there is a leak. The sensor line contains a carrier pipe. The wall of the carrier pipe has openings which are closed by at least one layer which is permeable for chlorine and contains a halogen-containing siloxane rubber.

4 Claims, 2 Drawing Sheets

(56) References Cited

FOREIGN PATENT DOCUMENTS

RU            95114520 A1     1/2010
WO       2006100098 A1     9/2006

OTHER PUBLICATIONS

Hagg, M.B. "Membrane Purification of Cl2 Gas—I. Permeabilities as a Function of Temperature for Cl2, O2, N2, H2 in Two Types of PDMS Membranes", Journal of Membrane Science, vol. 170, Issue 2, May 31, 2000, pp. 173-190.*

Zhang, H. et al., "The Permeability Characteristics of Silicone Rubber", Society for the Advancement of Material and Process Engineering (SAMPE), 2006 SAMPE Fall Technical Conference, 'Global Advances in Materials and Process Engineering', proceedings, Coatings and Sealants Section, Nov. 6-9, 2006, Dallas, TX, pp. 1-10.*

* cited by examiner

SENSOR LINE FOR MONITORING FOR AND LOCATING LEAKS AND METHOD FOR ITS PRODUCTION

CROSS-REFERENCE TO RELATED APPLICATION

This application claims the priority, under 35 U.S.C. §119, of German application DE 10 2008 014 808.3-54, filed Mar. 18, 2008; the prior application is herewith incorporated by reference in its entirety.

BACKGROUND OF THE INVENTION

Field of the Invention

The invention relates to a sensor line for monitoring for and locating leaks in an installation, in which chlorine escapes to the area surrounding the installation if there is a leak. The invention also relates to a method for producing such a sensor line.

European Patent EP 0 175 219 B1, corresponding to U.S. Pat. No. 4,735,095, discloses a sensor line containing a carrier pipe which is provided on its outer surface with a permeable layer through which a substance can diffuse, which escapes from a leak in an installation, for example a pipeline carrying a gas or a liquid, into the area surrounding the sensor line and which is to be detected. The carrier pipe is impenetrable for this substance. The wall of the carrier pipe has openings such that the substance passing through the permeable layer passes through the openings into the interior of the sensor line and can collect in the interior of the sensor line—also referred to as a collecting line. The location where the substance has penetrated into the sensor line and collected therein is then ascertained using a method known from German Patent DE 24 31 907 C3, corresponding to U.S. Pat. No. 3,977,233. This location corresponds to the place where the substance has escaped from the monitored installation part. To this end, a pump connected to the sensor line is used to feed the substance, which has penetrated into the sensor line, together with a carrier gas, which is located in the sensor line, to a sensor which is likewise connected to the sensor line. If the flow rate is known, the location where the substance penetrates into the sensor line and thus the location of the leak in the installation part can be ascertained from the time interval between switching on the pump and the arrival of the substance at the sensor.

In this context, ethylene vinyl acetate EVA has proven to be a particularly suitable material for the permeable layer in many applications. However, in particular if installation parts containing chlorine in gaseous or in liquid form, such as chlorine pipelines in installations of chemical process technology, are monitored for leaks, the use of EVA as the permeable layer has proven to be unsatisfactory. The reason for this is a reaction of the acetate molecules released from the EVA with the chlorine gas, which reaction causes the arrival of the chlorine gas at the sensor to be delayed.

SUMMARY OF THE INVENTION

It is accordingly an object of the invention to provide a sensor line for monitoring for and locating leaks and a method for its production that overcomes the above-mentioned disadvantages of the prior art devices and methods of this general type, which is suitable for detecting leaks in chlorine-containing installation parts in which chlorine escapes to the area surrounding the installation if there is a leak. The invention is also based on the object of specifying a method for producing such a sensor line.

The first-mentioned object is achieved by a sensor line containing a carrier pipe. The wall of the carrier pipe has openings which are closed by at least one layer which is permeable for a substance to be detected and contains a halogen-containing, preferably chlorine-containing, siloxane rubber. Such a halogenated, in particular chlorinated, siloxane rubber has a markedly reduced absorption capability of chlorine compared to non-halogenated or non-chlorinated siloxane rubber. This measure markedly increases the detection sensitivity and markedly shortens the response time since gaseous or liquid chlorine escaping into the area surrounding the sensor line is no longer absorbed, or absorbed only in significantly reduced amounts, in the siloxane rubber, with the result that, on the one hand, the diffusion rate is increased and, on the other hand, the losses occurring during the transport of the chorine gas plug, which has penetrated into the carrier pipe, through the carrier pipe to the sensor are markedly reduced.

The invention is based in this context on the consideration that a halogenated siloxane rubber has a markedly reduced absorption capability for chlorine, with the result that the latter can diffuse more quickly through the permeable layer and is lost due to absorption in the siloxane rubber layer to a markedly lesser degree during the transport through the sensor line.

Within the meaning of the present invention, a layer is also meant to be understood as a tube which surrounds the carrier pipe and closely bears against the carrier pipe.

The second object referred to above is achieved by a method in which a crosslinked siloxane rubber is applied onto the carrier pipe and the carrier pipe, which is provided with the siloxane rubber, is subjected to treatment with liquid or gaseous chlorine or with a chlorine etchant. The crosslinked siloxane rubber can be applied both by way of a method in which it is applied onto the carrier pipe as a viscous mass and by way of coating the carrier pipe with a prefabricated tube made of a crosslinked siloxane rubber.

Alternatively, the second objective is achieved by a method in which a tube containing a crosslinked siloxane rubber is applied onto the carrier pipe after treatment with liquid or gaseous chlorine or with a chlorine etchant.

The second object is also achieved by a method in which a siloxane rubber is applied onto the carrier pipe, in which siloxane rubber a halogenated hydrocarbon radical is bonded to at least part of the silicon atoms as an organic radical.

Other features which are considered as characteristic for the invention are set forth in the appended claims.

Although the invention is illustrated and described herein as embodied in a sensor line for monitoring for and locating leaks and a method for its production, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
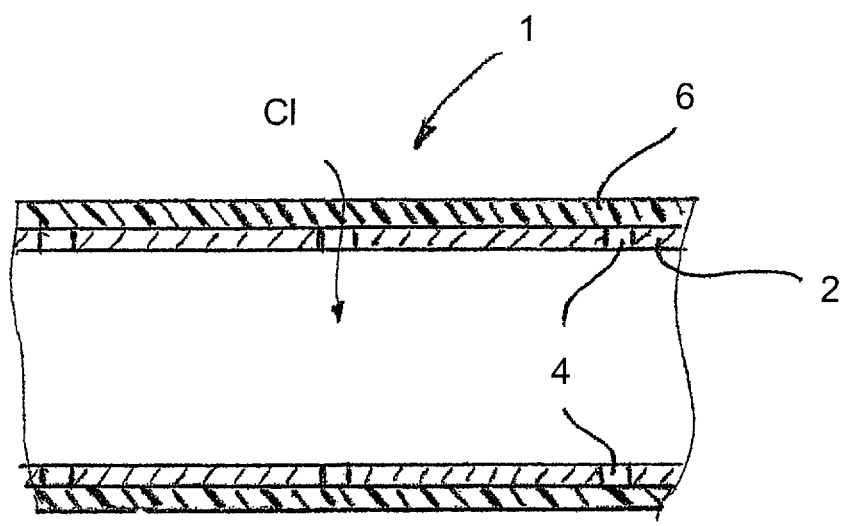
FIG. 1 is a diagrammatic, longitudinal sectional view of a collecting line according to the invention.
Figure 2:
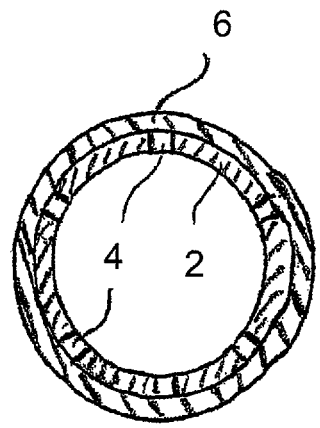
FIG. 2 is a diagrammatic, cross-sectional view of the collecting line.

Referring now to the figures of the drawing in detail and first, particularly, to FIGS. 1 and 2 thereof, there is shown a collecting line 1 containing a carrier pipe 2, for example made of polyvinyl chloride PVC, in particular of polyvinylidene-fluoride PVDF or polyetheretherketone PEEK, the wall of which has a large number of radial openings 4. Arranged on the carrier pipe 2 is a contiguous layer 6, which contains a halogenated, preferably chlorinated, siloxane rubber, is permeable for chlorine Cl to be detected, bears closely against the carrier pipe 2 and covers the entire carrier pipe 2 and thus closes the openings 4. Suitable for this are in particular wide-meshed polysiloxanes crosslinked with peroxides or platinum compounds.

Figure 3:
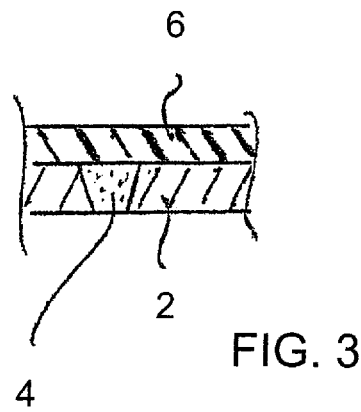
FIG. 3 is a diagrammatic, sectional view showing an alternative embodiment of openings made in the collecting line.

FIG. 3 illustrates an embodiment in which the openings 4 have a cone shape and taper in the direction of the interior of the carrier pipe 2 and are filled with a porous filling material which virtually does not inhibit the diffusion of chlorine Cl into the interior of the carrier pipe 2. This facilitates the envelopment of the carrier pipe 2 by a permeable layer 6 made of siloxane rubber, since in this case the siloxane rubber can also be applied in a low-viscosity liquid state without filling the openings 4 or flowing into the interior of the carrier pipe 2. Alternatively, the openings 4 can also be made in the carrier pipe 2 by suitable production methods, for example laser drilling, in a high number and with a very small diameter such that the siloxane rubber virtually cannot penetrate into the openings 4, even if it is applied in the liquid state.

Figure 4:
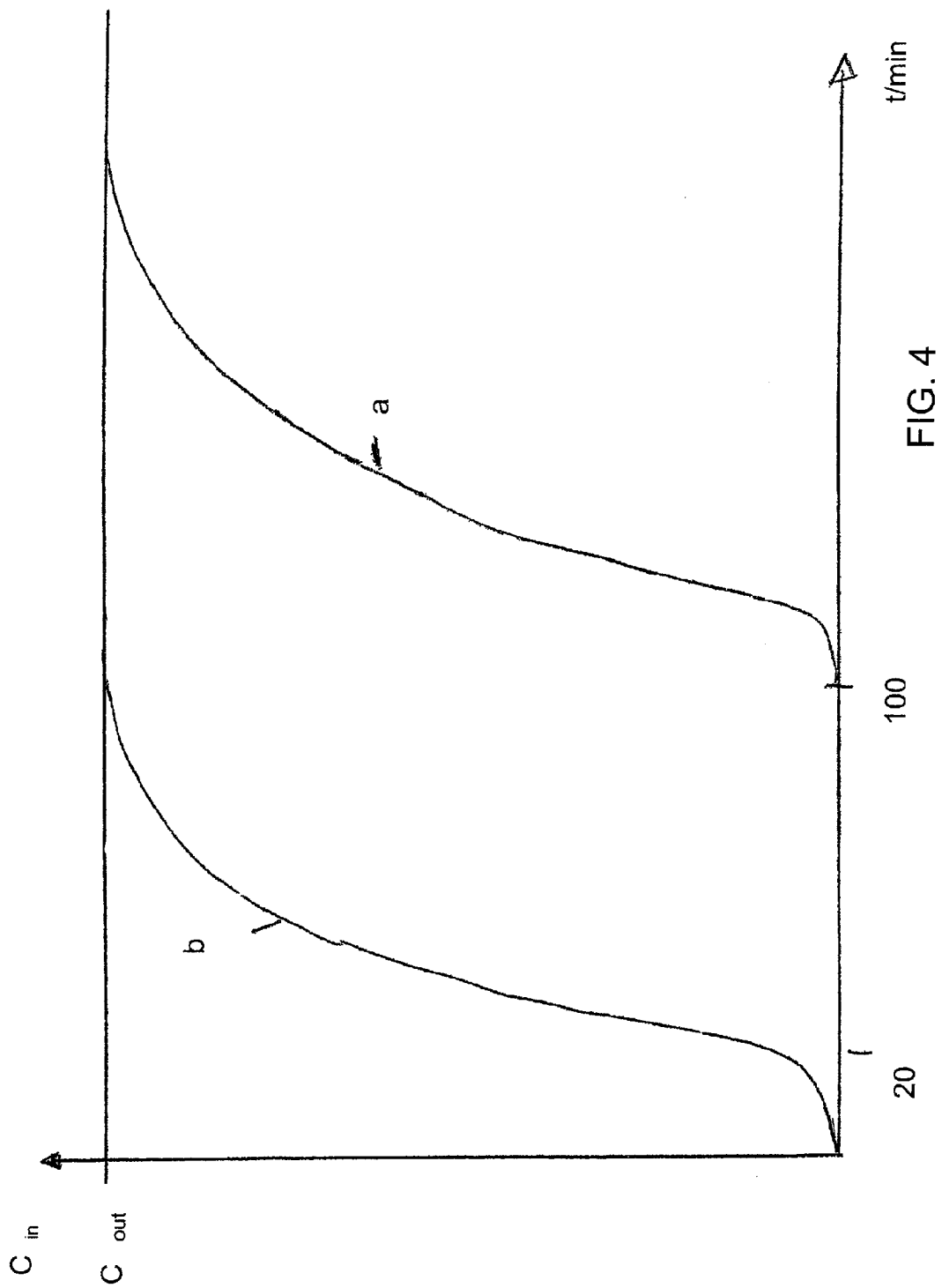
FIG. 4 is a graph showing chlorine concentration in an interior of a sensor line with a chlorinated siloxane rubber according to the invention and in a sensor line with a non-chlorinated siloxane rubber is plotted over time.

The diagram according to FIG. 4 shows the concentration $c_{in}$ of gaseous chlorine in an interior of a sensor line with a fixedly defined concentration $c_{out}$ of gaseous chlorine in an area surrounding the sensor line plotted over time t. Curve "a" indicates the temporal concentration profile for a sensor line which is provided with a layer which contains a non-halogenated siloxane rubber, with air at atmospheric pressure having a chlorine gas content of 1,000 ppm being located in the area surrounding the sensor line. Curve "b" shows the measured temporal concentration profile for a sensor line onto the carrier pipe of which a tube made of completely crosslinked siloxane rubber, in the example a silicone tube (thickness about 1 mm) which is available from Rehau AG+Co, Rehau, Germany, under the tradename RAU-SIK 8125 and is made of peroxide-crosslinked siloxane rubber, which tube was subjected to treatment with a chlorine etchant before it is applied onto the carrier pipe. It is clear from the diagram that the concentration $c_{in}$ in the interior of the sensor line reaches the maximum or saturation value $c_{in}=c_{out}$ much more quickly in a carrier pipe which is provided with a chlorinated siloxane rubber layer than if a non-chlorinated siloxane rubber is used. In other words, the diffusion rate of chlorine through the chlorinated siloxane rubber layer is significantly greater than through the non-chlorinated siloxane rubber layer.

The invention claimed is:

1. A sensor line for monitoring for and locating leaks in an installation in which chlorine escapes to an area surrounding the installation if there is a leak, the sensor line comprising:
   a carrier pipe having a wall with openings formed therein; and
   at least one layer being permeable for chlorine and containing a halogen-containing siloxane rubber, said at least one layer closing said openings.

2. The sensor line according to claim 1, wherein chlorine is provided as the halogen.

3. A method for detecting chlorine, comprising the steps of:
   providing a sensor line including:
      a carrier pipe having a wall with openings formed therein;
      at least one layer being permeable for chlorine and containing a halogen-containing siloxane rubber, said at least one layer closing said openings; and
   using the sensor line to detect chlorine.

4. The method according to claim 3, wherein chlorine is provided as the halogen.

* * * * *